(12) United States Patent
Yarbrough et al.

(10) Patent No.: US 10,473,086 B2
(45) Date of Patent: Nov. 12, 2019

(54) EROSION RESISTANT LEADING EDGE CAP FOR A WIND TURBINE ROTOR BLADE

(71) Applicant: General Electric Company, Schenectady, NY (US)

(72) Inventors: Aaron A. Yarbrough, Greenville, SC (US); Daniel Alan Hynum, Simpsonville, SC (US); James Robert Tobin, Simpsonville, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1113 days.

(21) Appl. No.: 14/835,859

(22) Filed: Aug. 26, 2015

(65) Prior Publication Data

US 2017/0058863 A1    Mar. 2, 2017

(51) Int. Cl.
*F03D 1/06* (2006.01)
*F03D 80/50* (2016.01)

(52) U.S. Cl.
CPC .......... *F03D 1/0675* (2013.01); *F03D 80/50* (2016.05); *F05B 2230/80* (2013.01); *Y02E 10/721* (2013.01); *Y02P 70/523* (2015.11)

(58) Field of Classification Search
CPC .... F03D 1/0675; F03D 80/50; F05B 2230/80; Y02E 10/721; Y02P 70/523; F01D 5/282
USPC ..................................... 416/224; 244/123.1
See application file for complete search history.

(56) References Cited

U.S. PATENT DOCUMENTS

| | | | |
|---|---|---|---|
| 6,264,877 B1 | 7/2001 | Pallu De La Barriere | |
| 8,317,479 B2 | 11/2012 | Vronsky et al. | |
| 8,657,581 B2 | 2/2014 | Pilpel et al. | |
| 8,673,106 B1 * | 3/2014 | Jolley | B29C 43/18 |
| | | | 156/285 |
| 8,747,098 B1 | 6/2014 | Johnson et al. | |
| 8,961,142 B2 | 2/2015 | Wansink | |
| 8,992,813 B2 | 3/2015 | Robbins et al. | |
| 2009/0148300 A1 | 6/2009 | Driver et al. | |

(Continued)

FOREIGN PATENT DOCUMENTS

CN      101906251 B     6/2013
IN      201006838 P1    10/2009
(Continued)

*Primary Examiner* — Mark A Laurenzi
*Assistant Examiner* — Paul W Thiede
(74) *Attorney, Agent, or Firm* — Dority & Manning, P.A.

(57) ABSTRACT

A wind turbine rotor blade may generally include a blade root, a blade tip opposite the blade root and a body shell extending between the blade root and the blade tip. The body shell may include a pressure side and a suction side extending between a leading edge and a trailing edge and may define an outer shell surface. The rotor blade may also include a leading edge cap coupled to the body shell at the leading edge. The leading edge cap may be formed from a fiber-reinforced composite including an inner surface extending directly adjacent to the body shell along a portion of the outer shell surface and an outer surface opposite the inner surface. The fiber-reinforced composite may include a plurality of fibers surrounded by a thermoplastic resin material, with the thermoplastic resin material extending throughout the fiber reinforced composite from the inner surface to the outer surface.

18 Claims, 11 Drawing Sheets

(56) References Cited

U.S. PATENT DOCUMENTS

| | | | |
|---|---|---|---|
| 2010/0062238 A1* | 3/2010 | Doyle | B29C 70/02 428/295.1 |
| 2011/0049297 A1* | 3/2011 | Jevons | F01D 5/282 244/123.1 |
| 2013/0164133 A1 | 6/2013 | Grove-Nielsen | |
| 2013/0164140 A1* | 6/2013 | Shah | F01D 5/20 416/223 A |
| 2014/0295187 A1 | 10/2014 | Jacobsen et al. | |
| 2014/0329017 A1* | 11/2014 | Wang | C08F 32/02 427/331 |

FOREIGN PATENT DOCUMENTS

| | | |
|---|---|---|
| JP | 2007092716 A | 4/2007 |
| WO | WO2010/025830 A2 | 3/2010 |
| WO | WO2011/088835 A2 | 7/2011 |
| WO | WO2011/098785 A2 | 8/2011 |
| WO | WO2015/015202 A1 | 2/2015 |

* cited by examiner

EROSION RESISTANT LEADING EDGE CAP FOR A WIND TURBINE ROTOR BLADE

FIELD OF THE INVENTION

The present subject matter relates generally to wind turbine rotor blades and, more particularly, to an erosion resistant leading edge cap for a wind turbine rotor blade formed from a thermoplastic-based fiber-reinforced composite.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During the operation of a wind turbine, the rotor blades may be subjected to a wide variety of environmental conditions. In many cases, such as when the wind turbines are located in coastal or desert areas, the rotor blades may be subjected to environmental conditions that include abrasive materials, such as sand particles and/or rain droplets. The interaction of these abrasive materials with the rotor blades may cause portions of the rotor blades to erode. In particular, the leading edges of rotor blades may be highly susceptible to erosion. Erosion of the various portions of the rotor blades limits the maximum rotational speed of the rotor blades, thus limiting the power output of the wind turbine.

To address the issues of erosion at the leading edge, is it known to install a leading edge cap onto a rotor blade. Typically, leading edge caps have been formed from metal or ceramic materials. Recently, attempts have been made to form leading edge caps from other materials, such as by forming a leading edge cap from a thermoset-based composite having a film consisting solely of a thermoplastic material applied the exterior surface thereof. Unfortunately, such leading edge caps often suffer from bonding issues, such as at the interface between the thermoplastic film and the thermoset-based composite and/or at the interface between the thermoset-based composite and the adjacent blade components.

Accordingly, an improved leading edge cap and associated rotor blade components that address one or more of the bonding issues of conventional leading edge protection systems would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade for a wind turbine. The rotor blade may generally include a blade root, a blade tip opposite the blade root and a body shell extending between the blade root and the blade tip. The body shell may include a pressure side and a suction side extending between a leading edge and a trailing edge and may define an outer shell surface. The rotor blade may also include a leading edge cap coupled to the body shell at the leading edge. The leading edge cap may be formed from a fiber-reinforced composite including an inner surface extending directly adjacent to the body shell along a portion of the outer shell surface and an outer surface opposite the inner surface. The fiber-reinforced composite may include a plurality of fibers surrounded by a thermoplastic resin material, with the thermoplastic resin material extending throughout the fiber reinforced composite from the inner surface to the outer surface.

In another aspect, the present subject matter is directed to a rotor blade for a wind turbine. The rotor blade may generally include a blade root, a blade tip opposite the blade root and a body shell extending between the blade root and the blade tip. The body shell may include a pressure side and a suction side extending between a leading edge and a trailing edge and may define an outer shell surface. The body shell may be formed from a fiber-reinforced composite including a plurality of fibers surrounded by a shell thermoplastic resin material. The rotor blade may also include a leading edge cap coupled to the body shell at the leading edge. The leading edge cap may be formed from a fiber-reinforced composite including an inner surface extending directly adjacent to the body shell along a portion of the outer shell surface and an outer surface opposite the inner surface. The fiber-reinforced composite may include a plurality of fibers surrounded by a thermoplastic resin material. In addition, the thermoplastic resin material of the leading edge cap may be welded to the shell thermoplastic resin material of the body shell at an interface defined between the inner surface of the leading edge cap and the outer shell surface of the body shell.

In a further aspect, the present subject matter is directed to a method for assembling a rotor blade of a wind turbine, wherein the rotor blade includes body shell having a pressure side and a suction side extending between a leading edge and a trailing edge. The method may generally include positioning a leading edge cap adjacent to an outer shell surface of the body shell at the leading edge of the rotor blade. The body shell may be formed at least partially from a shell thermoplastic resin material. The leading edge cap may be formed from a fiber-reinforced composite including an inner surface extending directly adjacent to the outer shell surface and an outer surface opposite the inner surface, wherein the fiber-reinforced composite includes a plurality of fibers surrounded by a thermoplastic resin material. In addition, the method may include welding the thermoplastic resin material of the leading edge cap to the shell thermoplastic resin material of the body shell at an interface defined between the inner surface of the leading edge cap and the outer shell surface of the body shell.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
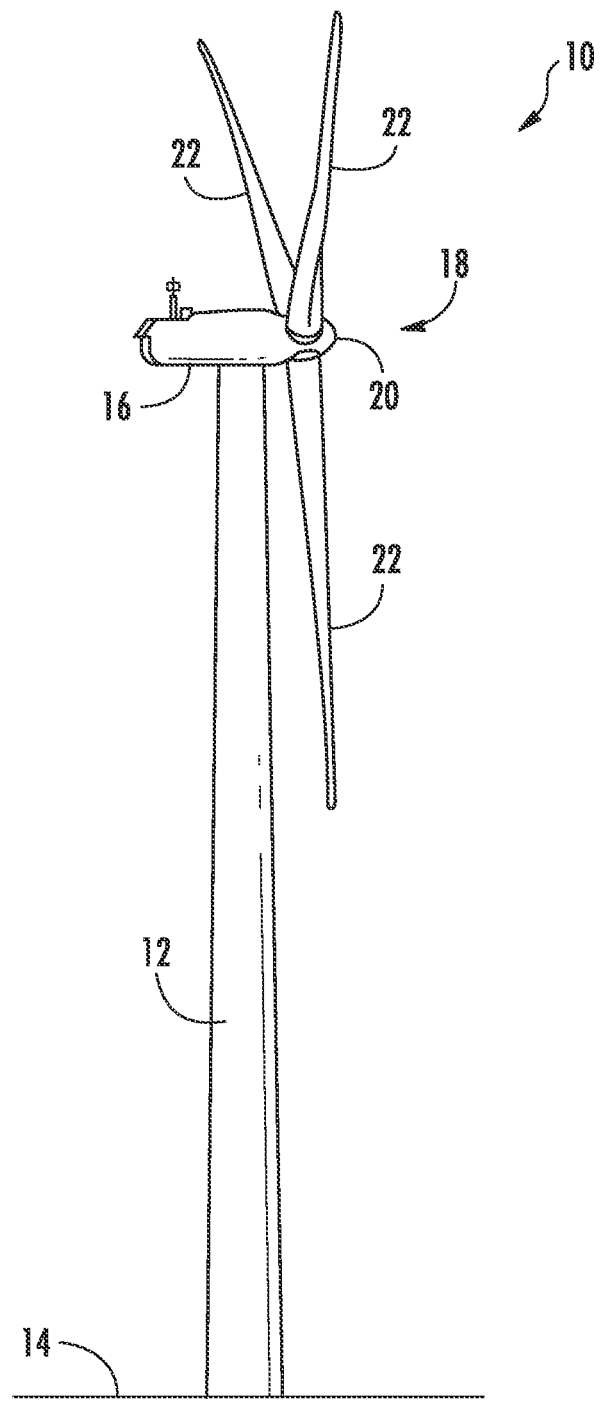
FIG. 1 illustrates a side view of one embodiment of a wind turbine in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a thermoplastic-based fiber-reinforced leading edge cap for providing enhanced erosion resistance for a wind turbine rotor blade. Specifically, in several embodiments, the leading edge cap may be formed from a fiber-reinforced composite including a plurality of fibers surrounded by a thermoplastic resin material, with the thermoplastic resin material generally be dispersed throughout the fiber-reinforced composite. In such embodiments, by forming the body shell of the rotor blade from the same or a similar thermoplastic-based fiber-reinforced composite, the leading edge cap may be welded onto the rotor blade at is leading edge via thermoplastic welding. For example, in a particular embodiment, the pressure and suction side shells forming the body shell of the rotor blade may each be formed from a fiber-reinforced composite including a plurality of fibers surrounded by a thermoplastic resin material. As such, when the pressure and suction side shells are joined together at the leading edge joint of the rotor blade, the leading edge cap may be positioned at the leading edge of the rotor blade and welded to the pressure and suction side shells along both sides of the joint. Accordingly, in addition to providing erosion resistance at the leading edge of the blade, the leading edge cap may also enhance the structural integrity of the joint formed between the pressure and suction side shells.

It should be appreciated that the thermoplastic resin materials described herein differ from conventional thermoset resin materials. Specifically, as used herein, thermoplastic materials generally encompass a plastic material or polymer that is reversible in nature. For example, thermoplastic materials typically become pliable or moldable when heated to a certain temperature and return to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), polyethylene terephthalate glycol-modified (PETG), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to, polyolefins, polyamides, fluropolymer, ethyl-methyl acrylate, polyesters, polycarbonates, and/or acetals. More specifically, example semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. In contrast, thermoset materials generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies and/or similar materials.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
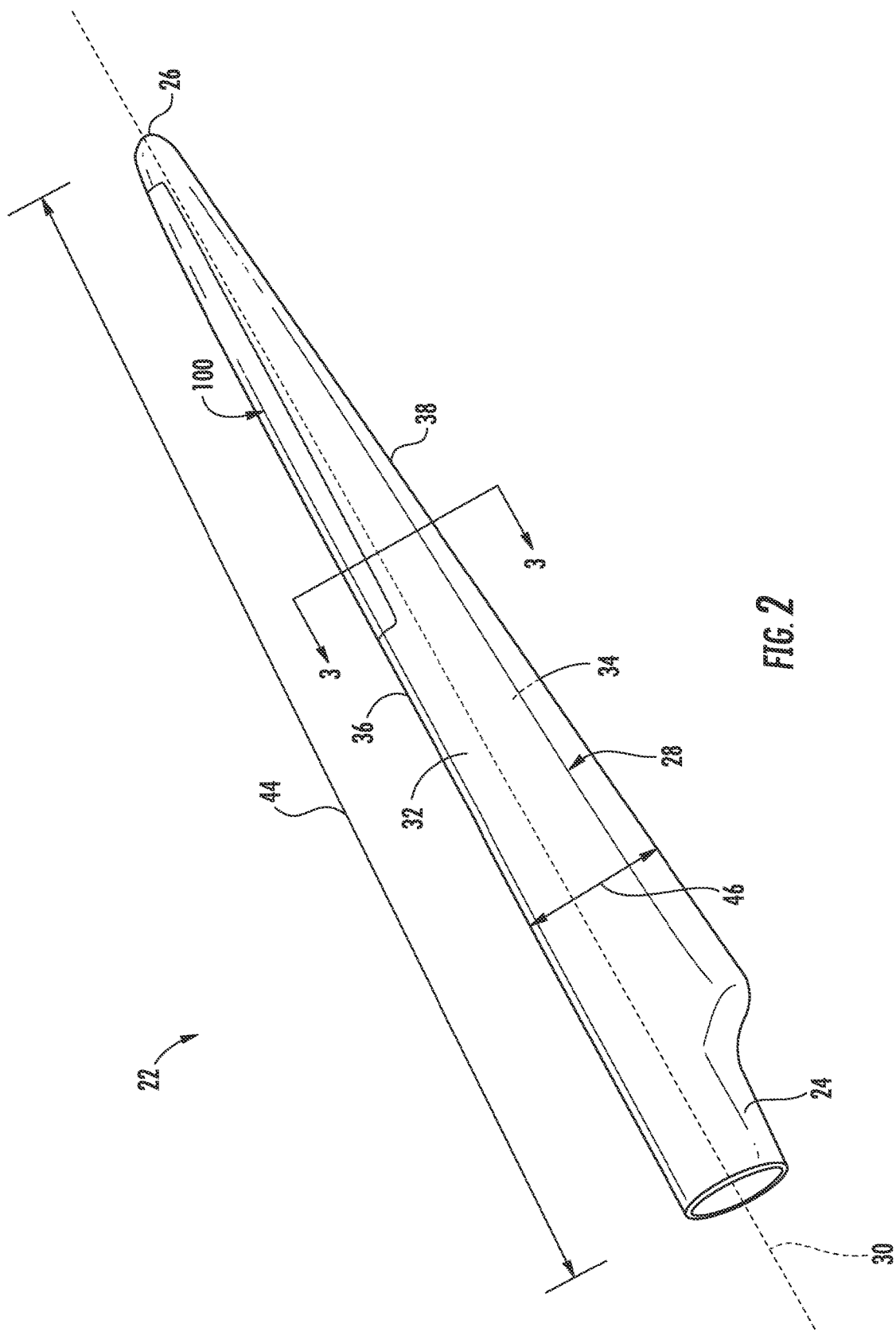
FIG. 2 illustrates a perspective view of one embodiment of a wind turbine rotor blade in accordance with aspects of the present subject matter, particularly illustrating a leading edge cap installed at the leading edge of the rotor blade.
Figure 3:
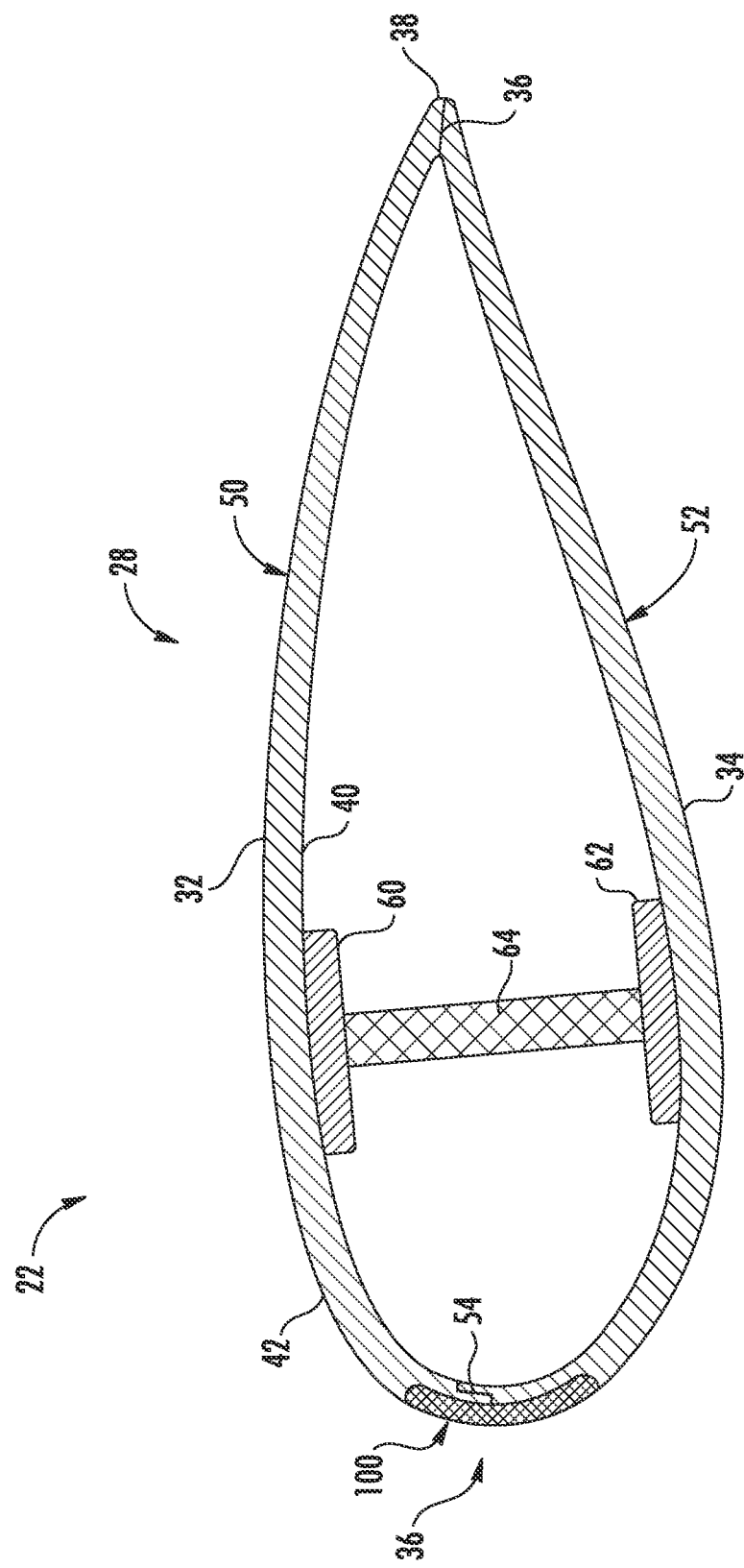
FIG. 3 illustrates a cross-sectional view of the rotor blade shown in FIG. 2 taken about line 3-3, particularly illustrating the leading edge cap installed at the leading edge of the rotor blade across a leading edge joint defined between pressure and suction side shells of the blade.

Referring now to FIGS. 2 and 3, one embodiment of a rotor blade 22 suitable for use within the wind turbine 10 shown in FIG. 1 is illustrated in accordance with aspects of the present subject matter. Specifically, FIG. 2 illustrates a perspective view of the rotor blade 22. Additionally, FIG. 3 illustrates a cross-sectional view of the rotor blade 22 taken about line 3-3 shown in FIG. 2.

As shown, the rotor blade 22 generally includes a blade root 24 configured to be mounted or otherwise secured to the hub 20 (FIG. 1) of the wind turbine 10 and a blade tip 26 disposed opposite the blade root 24. Additionally, the rotor blade 22 may include a body shell 28 configured to extend between the blade root 24 and the blade tip 26 along a longitudinal or spanwise axis 30 of the blade 22. The body shell 28 may generally serve as the outer casing/covering of the rotor blade 22 and may define a substantially aerodynamic profile, such as by defining a symmetrical or cambered airfoil-shaped cross-section. As particularly shown in FIG. 3, the body shell 28 may define a pressure side 32 and a suction side 34 extending between leading and trailing edges 36, 38 of the rotor blade 22. The body shell 28 may also define an inner shell surface 40 (FIG. 3) and an outer shell surface 42 (FIG. 3). Further, the rotor blade 22 may also have a span 44 defining the total length between the blade root 24 and the blade tip 26 and a chord 46 defining the total length between the leading edge 36 and the trailing edge 38. As is generally understood, the chord 46 may generally vary in length with respect to the span 44 as the rotor blade 22 extends from the blade root 24 to the blade tip 26.

In several embodiments, the body shell 28 of the rotor blade 22 may be formed from a plurality of shell components or sections. For example, as shown in FIG. 3, in one embodiment, the body shell 28 may be formed from two separate shells, namely a pressure side shell 50 and a suction side shell 52. In such an embodiment, the pressure side shell 50 may generally be configured to define the pressure side 32 of the rotor blade 22 and the suction side shell 52 may generally be configured to define the suction side 34 of the rotor blade 22, with the pressure and suction sides shells 50, 52 being configured to be joined together at the leading and trailing edges 36, 38 of the rotor blade 22. For instance, as shown in FIG. 3, a leading edge joint 54 may be defined between the pressure and suction side shells 50, 52 at the leading edge 36 of the blade 22 and a trailing edge joint 56 may be defined between the pressure and suction side shells 50, 52 at the trailing edge 38 of the blade 22. Alternatively, the body shell 28 may be formed from any other suitable number and/or arrangement of shell sections. For instance, in one embodiment, the body shell 28 may be segmented along the longitudinal axis 30 of the rotor blade 22, with each spanwise segment being formed from one or more shell sections.

Additionally, the body shell 28 (and, thus, the pressure and suction side shells 50, 52) may generally be formed from any suitable material. For instance, in several embodiments, the body shell 28 (and pressure and suction side shells 50, 52) may be formed from a fiber-reinforced composite. As will be described below, the fiber-reinforced composite may include a plurality of fibers surrounded by a matrix material. In such embodiments, the matrix material may, for example, correspond to a thermoplastic resin material.

Referring particularly to FIG. 3, the rotor blade 22 may also include one or more longitudinally extending structural components configured to provide increased stiffness, buckling resistance and/or strength to the blade 22. For example, the rotor blade 22 may include a pair of longitudinally extending spar caps 60, 62 configured to be engaged against the opposing inner surfaces 40 of the pressure and suction side shells 60, 62, respectively. Additionally, one or more shear webs 64 may be disposed between the spar caps 60, 62 so as to form a beam-like configuration. The spar caps 60, 62 may generally be designed to control the bending stresses and/or other loads acting on the rotor blade 22 in a generally spanwise direction (a direction parallel to the span 44 of the rotor blade 22) during operation of a wind turbine 10. Similarly, the spar caps 60, 22 may also be designed to withstand the spanwise compression occurring during operation of the wind turbine 10.

Moreover, as shown in FIGS. 2 and 3, the rotor blade 22 may also include a leading edge cap 100 coupled to the body shell 28 along the leading edge 36 of the rotor blade 22. In general, the leading edge cap 100 may be configured to provide increased erosion resistance for the rotor blade 22. For instance, the leading edge cap 100 may be configured to protect the leading edge 36 of the body shell 28 (and portions of the shells 50, 52 extending adjacent to the leading edge 36) from various conditions that cause erosion, such as abrasive environmental conditions including, for example, sand particles and/or rain droplets.

As particularly shown in FIG. 2, the leading edge cap 100 may, in certain embodiments, be configured to extend spanwise along only a portion of the span 44 of the rotor blade 22. For instance, in a particular embodiment, the leading edge cap 100 may only be configured to extend along all or portion of the outboard half of the rotor blade 22 (i.e., along a portion(s) of the rotor blade 22 located a distance from the blade root 24 that is equal to more than 50% of the blade span 44). However, it should be appreciated that the present subject matter is not limited to the leading edge cap 100 being positioned on or extending along only a certain portion of the span 44 of the rotor blade 22. Rather, any installation of the disclosed leading edge cap 100 along any portion of the span 44 of the rotor blade 22 is intended to be within the scope and spirit of the present subject matter.

It should also be appreciated that, although FIG. 2 illustrates the rotor blade 22 including a single leading edge cap 100, the rotor blade 22 may generally include any number of leading edge caps 100 installed along the leading edge 36 of the blade 22. For instance, in one embodiment, the rotor blade 22 may include two or more leading edge caps 100 spaced apart from one another along the span 44 of the rotor blade 22.

Figure 4:
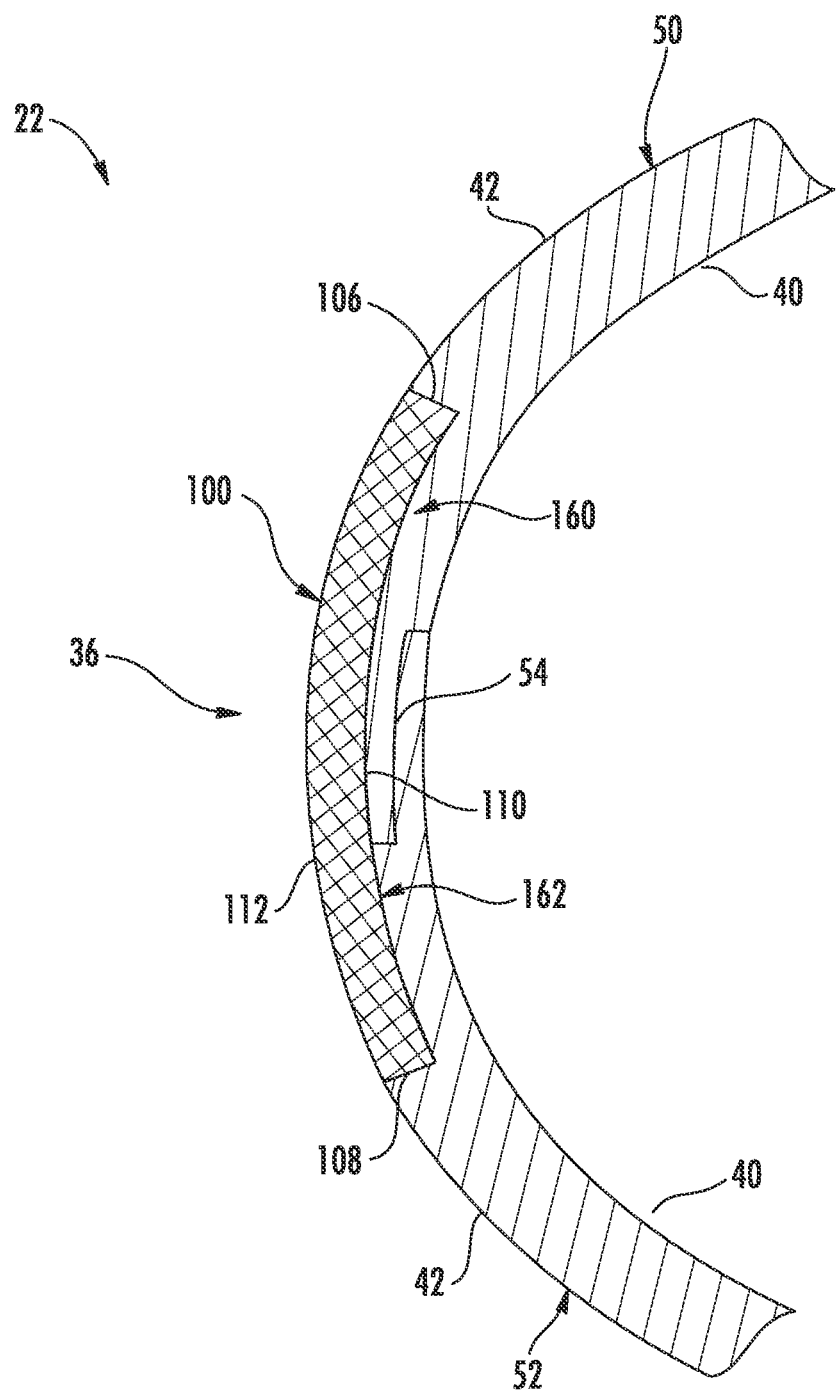
FIG. 4 illustrates a close-up, assembled view of a leading edge portion of the rotor blade shown in FIG. 3, particularly illustrating the leading edge cap positioned within recessed areas defined by the pressure and suction side shells at locations adjacent to the leading edge of the rotor blade.
Figure 5:
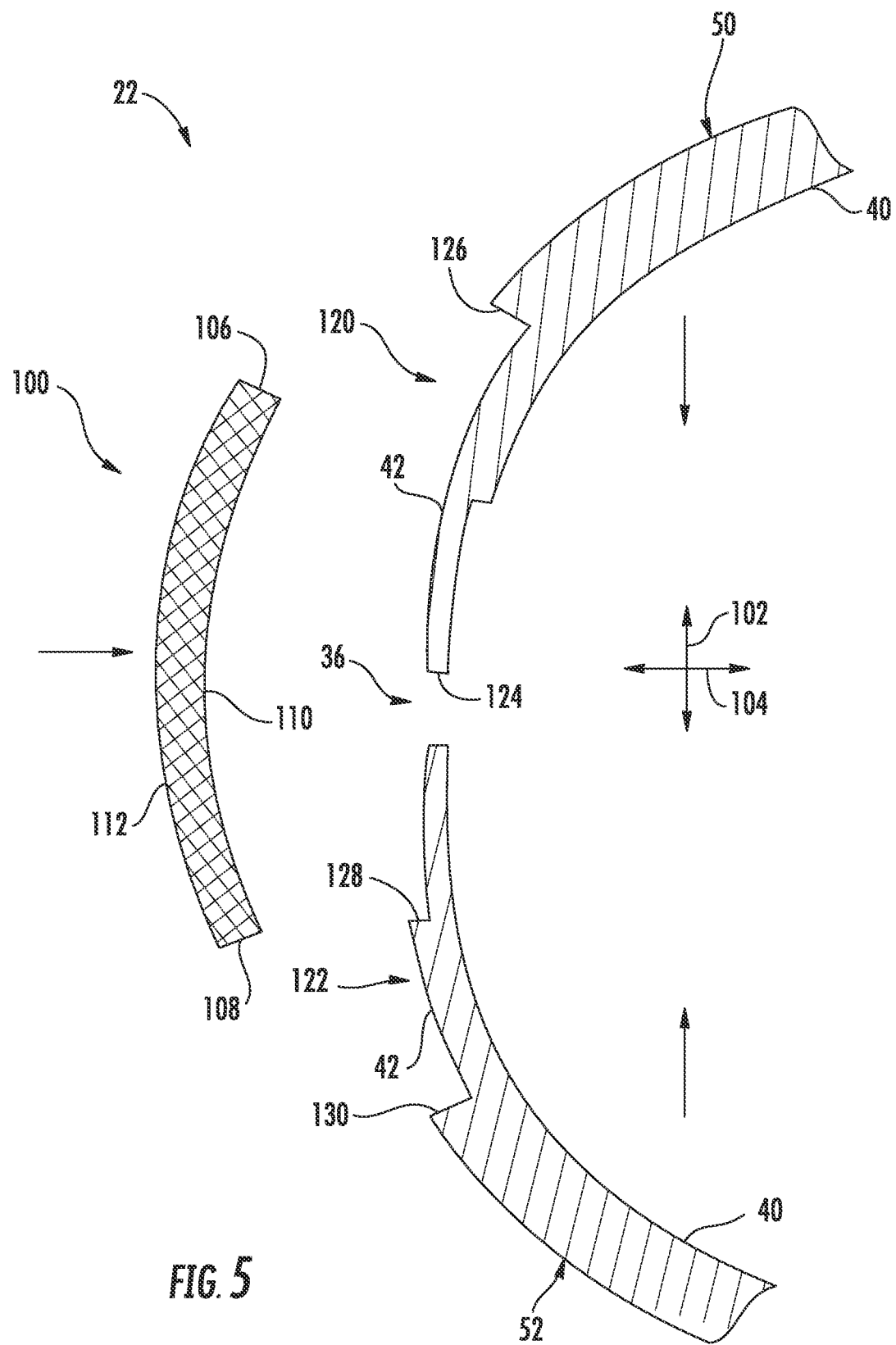
FIG. 5 illustrates an exploded view of the rotor blade components shown in FIG. 4.

Referring now to FIGS. 4 and 5, partial, cross-sectional views of the rotor blade 22 shown in FIG. 3 are illustrated in accordance with aspects of the present subject matter. Specifically, FIG. 4 illustrates a partial, assembled view of the leading edge portion of the blade 22 shown in FIG. 2, particularly illustrating the leading edge cap 100 coupled to the pressure and suction side shells 50, 52 at the leading edge 36 of the blade 22. Additionally, FIG. 5 illustrates an exploded view of the rotor blade components shown in FIG. 4.

As particularly shown in FIG. 5, the leading edge cap 100 may generally extend in a heightwise direction (indicated by arrow 102) between a top surface 106 and a bottom surface 108 and in a chordwise direction (indicated by arrow 104) between an inner surface 110 and an outer surface 112. The inner surface 110 of the leading edge cap 100 may generally be configured to be positioned adjacent to the outer shell surfaces 42 of the pressure and suction side shells 50, 52 when the leading edge cap 100 is coupled to the rotor blade 22 at its leading edge 36. For example, as shown in FIG. 4, the leading edge cap 100 may be configured to extend across the leading edge joint 54 defined between the pressure and suction side shells 50, 52 at the leading edge 36 of the rotor blade 22 such that a joint interface is defined between the inner surface 110 of the leading edge cap 100 and the portions of the outer shell surfaces 42 of the pressure and suction side shells 50, 52 extending adjacent to the leading edge 36. As such, the leading edge cap 100 may be coupled to portions of the exterior of both the pressure side shell 50 and the suction side shell 52 along each side of the leading edge joint 54.

The outer surface 112 of the leading edge cap 100 may generally be configured to define the exterior side or surface of the cap 100. In several embodiments, the outer surface 112 may be configured to be aligned with the outer shell surfaces 42 of the pressure and suction side shells 50, 52 when the leading edge cap 100 is installed onto the rotor blade 22, thereby providing a smooth aerodynamic surface at the interface between the shells 50, 52 and the leading cap 100. For example, as particularly shown in FIG. 5, portions of the outer shell surfaces 42 of the pressure and suction side shells 50, 52 may be recessed so as to define recessed areas 120, 122 adjacent to the leading edge 36 of the rotor blade 22 for receiving the leading edge cap 100. Specifically, as shown in FIG. 5, the pressure side shell 50 may define a first recessed area 120 extending along its outer shell surface 42 from a joint end 124 of the shell 50 (i.e., the location at which the leading edge joint 54 is defined) to a first end 126. Similarly, the suction side shell 52 may define a second recessed area 122 extending along its outer shell surface 42 from a joint end 128 of the shell 52 (i.e., the location at which the leading edge joint 54 is defined) to a second end 130. In such an embodiment, the leading edge cap 100 may be configured to be received within the recessed areas 120, 122 defined by the pressure and suction side shells 50, 52 such that the top surface 106 of the leading edge cap 100 is positioned adjacent to the first end 126 of the first recessed area 122 and the bottom surface 108 is positioned adjacent to the second end 130 of the second recessed area 122. Additionally, as particularly shown in FIG. 4, a dimension of each recessed area 120, 122 may be selected such that, when the leading edge cap 100 is installed onto the rotor blade 22, the outer surface 112 of the leading edge cap 100 is substantially aligned with both the outer shell surface 42 of the pressure side shell 50 at the first end 126 of the first recessed area 120 and the outer shell surface 42 of the suction side shell 52 at the second end 130 of the second recessed area 122.

As indicated above, similar to the pressure and suction side shells 50, 52, the leading edge cap 100 may be formed from a fiber-reinforced composite. Specifically, in several embodiments, the fiber-reinforced composite may correspond to a thermoplastic-based fiber-reinforced composite including a plurality of fibers surrounded by a thermoplastic resin material. In such embodiments, thermoplastic resin material may extend throughout the fiber-reinforced composite from the inner surface 110 to the outer surface 112 of the leading edge cap 100. As such, the fiber-reinforced thermoplastic resin material positioned along the outer surface 112 may provide enhanced erosion resistance for the rotor blade 22. In addition, the fiber-reinforced thermoplastic resin material positioned along the inner surface 110 may allow for the leading edge cap 100 to be securely coupled to the pressure and suction side shells 50, 52. For instance, as will be described below, the thermoplastic resin material contained within the leading edge cap 100 may be welded to the thermoplastic resin material included within the pressure and suction side shells 50, 52 via thermoplastic welding at the interface defined between the inner surface 110 of the leading edge cap 100 and the portions of the outer shell surfaces 42 of the pressure and suction side shells 50, 52 extending along the first and second recessed areas 120, 122.

Figure 6:
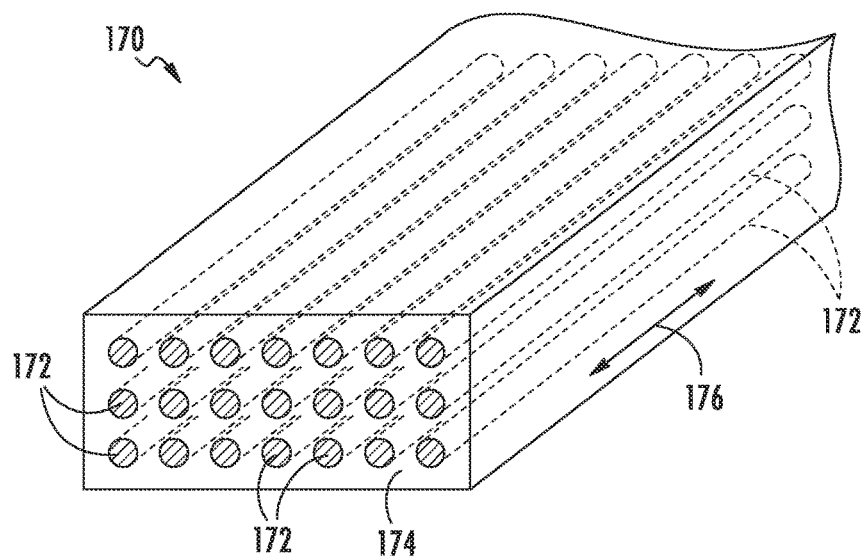
FIG. 6 illustrates a partial, perspective view of one example of a fiber-reinforced composite that may be used to form one or more of the rotor blade components described herein, particularly illustrating the fiber-reinforced composite including a plurality of fibers surrounded by a resin matrix material.

FIG. 6 illustrates a partial, perspective view of an example fiber-reinforced composite 170 that may be used to form any of the rotor blade components described above, such as the pressure side shell 50, the suction side shell 52 and/or the leading edge cap 100, in accordance with aspects of the present subject matter. As shown, the fiber-reinforced composite 170 may include a plurality of fibers 172 (e.g., glass or carbon fibers) surrounded by or joined together via a resin matrix material 174. In the illustrated embodiment, the fibers 172 are unidirectional and, thus, are all oriented in a common fiber direction 176. However, in other embodiments, the fibers 172 may be oriented in two or more directions.

As indicated above, in several embodiments, the resin matrix material 174 may correspond to a thermoplastic resin material. In such embodiments, the use of the thermoplastic resin material may allow adjacent blade components of the rotor blade to be welded together at the interface defined between such components via thermoplastic welding. Specifically, the thermoplastic resin material(s) used to form the adjacent blade components may be heated to its thermoplastic state(s) while applying pressure to the material(s) to create a secure, welded joint between the blade components.

Referring back to FIGS. 4 and 5, in embodiments in which the leading edge cap 100 and the pressure and suction side shells 50, 52 are formed from thermoplastic-based fiber-reinforced composites, the leading edge cap 100 may be welded to the pressure and suction side shells 50, 52 in order to secure the leading edge cap 100 to the rotor blade 22. Specifically, the thermoplastic resin material of the leading edge cap 100 may be welded to the thermoplastic resin material of the pressure and suction side shells 50, 52 (also referred to herein as the "shell thermoplastic resin material) at the interface defined between the inner surface 110 of the leading edge cap 100 and the outer shell surfaces 42 of the pressure and suction side shells 50, 52. For example, as shown in FIG. 4, a first welded joint 160 may be formed at the interface defined between the leading edge cap 100 and the pressure side shell 50 by welding a portion of the thermoplastic resin material located along the inner surface 100 of the leading edge cap 100 to the thermoplastic resin material located along the portion of the outer shell surface 42 of the pressure side shell 50 extending along the first recessed area 120. Similarly, a second welded joint 162 may be formed at the interface defined between the leading edge cap 100 and the suction side shell 52 by welding a portion of the thermoplastic resin material located along the inner surface 100 of the leading edge cap 100 to the thermoplastic resin material located along the portion of the outer shell surface 42 of the suction side shell 52 extending along the second recessed area 122.

It should be appreciated that, in several embodiments, the leading edge cap 100 may have a different fiber density than the pressure and suction side shells 50, 52. For instance, in one embodiment, the leading edge cap 100 may have a lower fiber density than the pressure and suction side shells 50, 52, thereby providing a higher concentration of thermoplastic resin material for welding the leading edge cap 100 to the pressure and suction side shells 50, 52.

As indicated above, the leading edge cap 100 may be configured to provide increased erosion resistance for the rotor blade 22. However, by welding the thermoplastic-based fiber-reinforced composite of the leading edge cap 100 across the leading edge joint 54 formed between the pressure and suction side shells 50, 52, the leading edge cap 100 may also provide additional structural integrity to the leading edge joint 54 as well as provide an additional attachment means between the pressure and suction side shells 50, 52. In certain instances, the leading edge cap 100 may serve as the primary (or only) means for coupling the pressure and suction side shells 50, 52 together at the leading edge 36 of the blade 22. For example, in one embodiment, the pressure and suction side shells 50, 52 may not be directly coupled to one another at the leading edge joint 54, but, rather, may be coupled together solely via the welded connections provided by the leading edge cap 100. Moreover, the welded joint(s) 160, 162 formed between the leading edge cap 100 and the pressure and suction side shells 50, 52 may provide a more secure connection than that provided by adhesives and/or by using other bonding/attachment techniques. Further, the leading edge cap 100 may also provide additional edge stiffness for the rotor blade 22.

It also should be appreciated that, in embodiments in which the pressure and suction side shells 50, 52 are formed from thermoplastic-based fiber-reinforced composites, the joints 54, 56 defined between the shells 50, 52 may also be formed via thermoplastic welding. For instance, in the embodiment shown in FIG. 4, the thermoplastic resin material contained within the pressure side shell 50 may be welded to the thermoplastic resin material contained within the suction side shell 52 at the leading edge joint 54 to form a welded joint at the interface defined between the shells 50, 52.

Additionally, it should be appreciated that, in several embodiments, the thermoplastic resin material used to form the leading edge cap 100 may be the same as the thermoplastic resin material used to form the pressure and suction side shells 50, 52. For example, each of the thermoplastic resin materials may include the same resin chemistry. Alternatively, the thermoplastic resin materials may correspond to differing resin materials that are otherwise capable of being welded together to form a secure welded joint. For example, certain compatible thermoplastic resin materials may be welded together even though the thermoplastic materials have differing resin chemistries.

Figure 7:
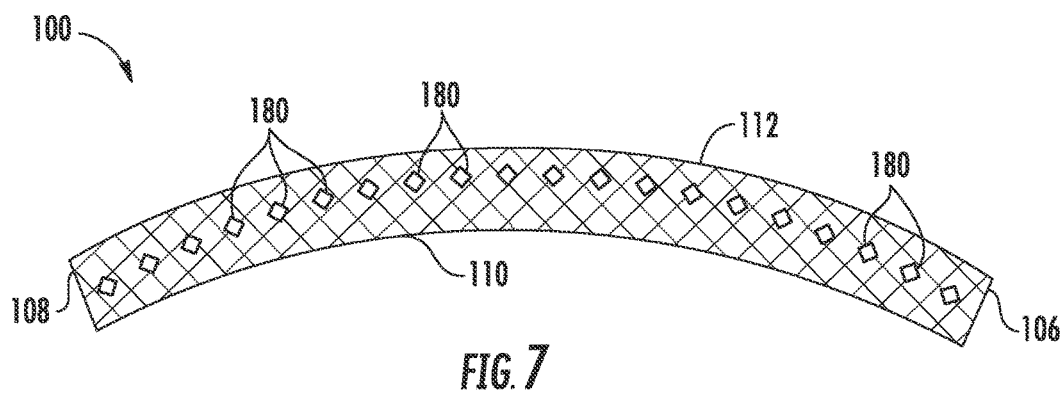
FIG. 7 illustrates a cross-sectional view of one embodiment of a leading edge cap that includes erosion resistant additives dispersed therein.

Moreover, it should be appreciated that, in several embodiments, the fiber-reinforced composite used to form the leading edge cap 100 may include one or more erosion resistant additives dispersed within and/or throughout the thermoplastic resin material. For example, FIG. 7 illustrates a cross-sectional view of one embodiment of the leading edge cap 100 described above in which an erosion resistant additive(s) 180 has been dispersed within the fiber-reinforced composite forming the cap 100. In such an embodiment, the erosion resistant additive(s) 180 may correspond to any suitable additive that enhances the erosion resistance of the leading edge cap 100. For instance, suitable erosion resistant additive(s) 180 may include, but are not limited to, PTFE-based additives, silicon-based additives, molybdenum disulfide-based additives, graphite-based additives, aramid fibers, carbon fibers and/or rubberized material additives.

Figure 8:
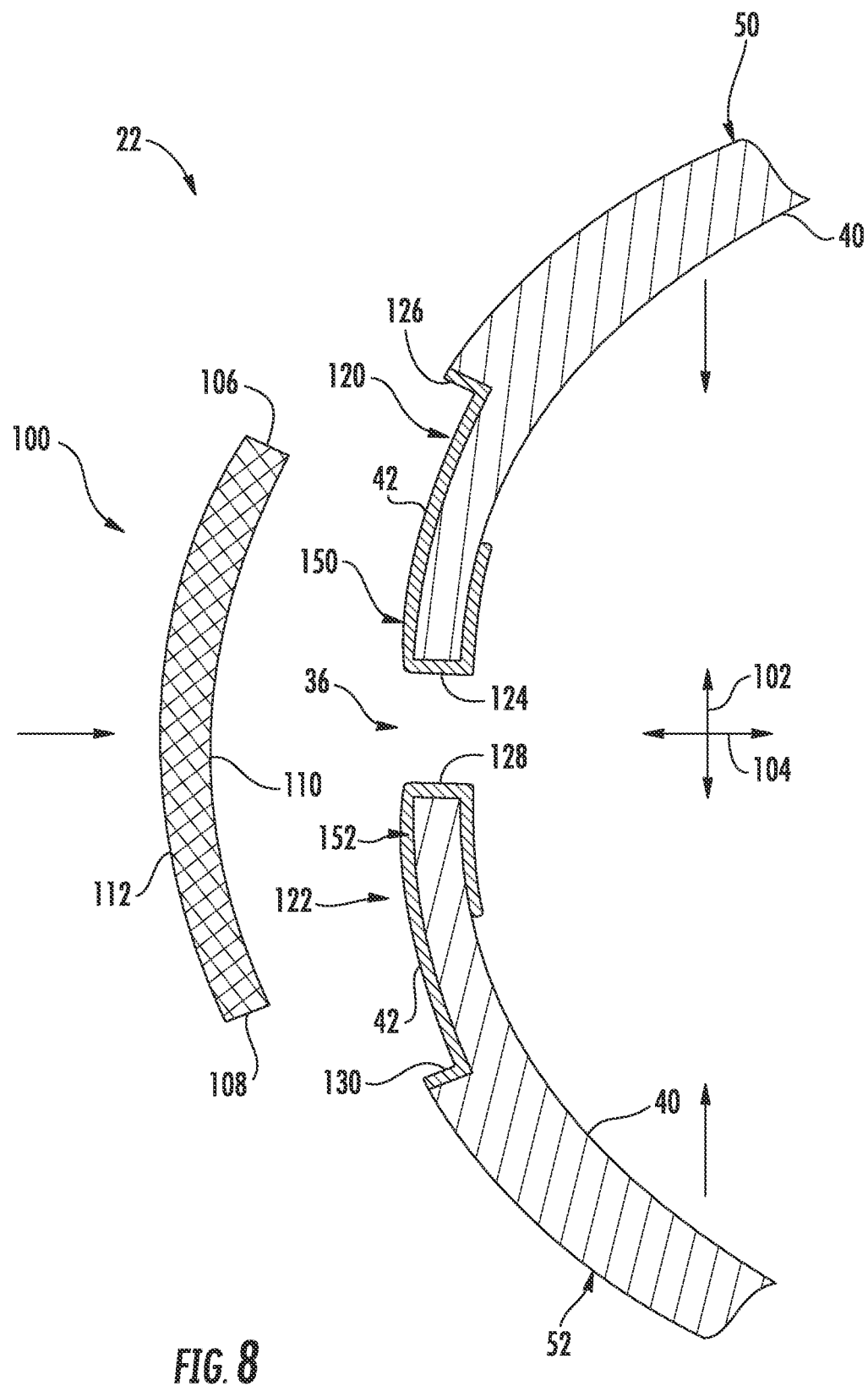
FIG. 8 illustrates another embodiment of the rotor blade components shown in FIGS. 4 and 5, particularly illustrating the leading edge cap and the pressure and suction side shells exploded away from one another for purposes of illustration.

Referring now to FIG. 8, another embodiment of the rotor blade 22 shown in FIGS. 2-5 is illustrated in accordance with aspects of the present subject matter. Specifically, FIG. 8 illustrates a partial, exploded view of the leading edge portion of the blade 22 shown in FIG. 2, particularly illustrating the leading edge cap 100 and the pressure and suction side shells 50, 52 exploded away from one another for purposes of illustration.

As indicated above, in several embodiments, the pressure and suction side shells 50, 52 may be formed from a thermoplastic-based fiber-reinforced composite, which may allow the thermoplastic resin material contained within each of the shells 50, 52 to be welded to the thermoplastic resin material of the leading edge cap 100. However, in other embodiments, the pressure and suction side shells 50, 52 may be formed from a thermoset-based fiber-reinforced composite, such as a fiber-reinforced composite including a plurality of fibers surrounded by a thermoset resin material. In such embodiments, the leading edge cap 100 may be secured to the pressure and suction side shells 50, 52 at the leading edge 36 of the rotor blade 22 using adhesives, a wet lay-up process and/or the like.

Alternatively, each of the thermoset-based shells 50, 52 may include a layer of thermoplastic resin material disposed at the interface(s) defined between the shells 50, 52 and the leading edge cap 100 to allow a welded connection to be formed between such components. For instance, as shown in FIG. 8, the pressure side shell 50 includes a first layer 150 of thermoplastic resin material positioned on the exterior of the shell 50 at the leading edge 36 of the blade 22 such that the thermoplastic layer 150 defines the portion of the outer shell surface 42 extending along the first recessed area 120 from the joint end 124 to the first end 126. Similarly, the suction side shell 52 includes a second layer 152 of thermoplastic resin material positioned on the exterior of the shell 52 at the leading edge 36 of the blade 22 such that the thermoplastic layer 152 defines the portion of the outer surface 42 extending along the second recessed area 122 from the joint end 128 to the second end 130. It should be appreciated that each of the thermoplastic layers 150, 152 may correspond to a coating applied to the exterior of the shells 50, 52 or may correspond to a co-infused layer of each shell 50, 52.

By providing the layers 150, 152 of thermoplastic resin material along the recessed areas 120, 122 of the pressure and suction side shells 50, 52, the leading edge cap 100 may be welded directly to the shells 50, 52 at the leading edge 36 of the blade 22. Specifically, the thermoplastic resin material of the leading edge cap 100 may be welded to the thermoplastic layers 150, 152 of the pressure and side shells 50, 52 at the interface defined between the inner surface 110 of the leading edge cap 100 and the outer shell surfaces 42.

Additionally, as shown in FIG. 8, in one embodiment, the thermoplastic layers 150, 152 may be configured to wrap around the joint ends 128, 128 of the shells 50, 52 so as to extend along portions of the inner shell surfaces 40. As such, the thermoplastic resin material contained within the layers 150, 152 along with the thermoplastic resin material contained within the leading edge cap 100 may all be welded together to form the leading edge joint 54 defined at the interface between the pressure and suction side shells 50, 52.

Further, it should be appreciated that the present subject matter is also directed to a method for assembling a wind turbine rotor blade. In one embodiment, the method may include positioning a leading edge cap adjacent to an outer shell surface of a body shell of the rotor blade. As indicated above, in several embodiments, the leading edge cap 100 and the body shell may 28 be formed from fiber-reinforced composites, with each fiber-reinforced composite including a plurality of fibers 172 surrounded by a thermoplastic resin material 174. In addition, the method may include welding the thermoplastic resin material of the leading edge cap 100 to the thermoplastic resin material of the body shell at an interface defined between an inner surface 110 of the leading edge cap 100 and the outer shell surface 42 of the body shell.

It should be appreciated that the thermoplastic materials described herein may welded together using any suitable welding device, means and/or method known in the art. For instance, suitable thermoplastic welding methods may include, but are not limited to, thermal welding, resistive welding, infrared welding, ultrasonic welding and/or chemical welding. Thermal welding may be achieved, for example, by heating the thermoplastic materials using a heat lamp, a laser light source, a heated flow of fluid and/or any other suitable heating device (e.g., a heat blanket or other conductive heating source).

Figure 9:
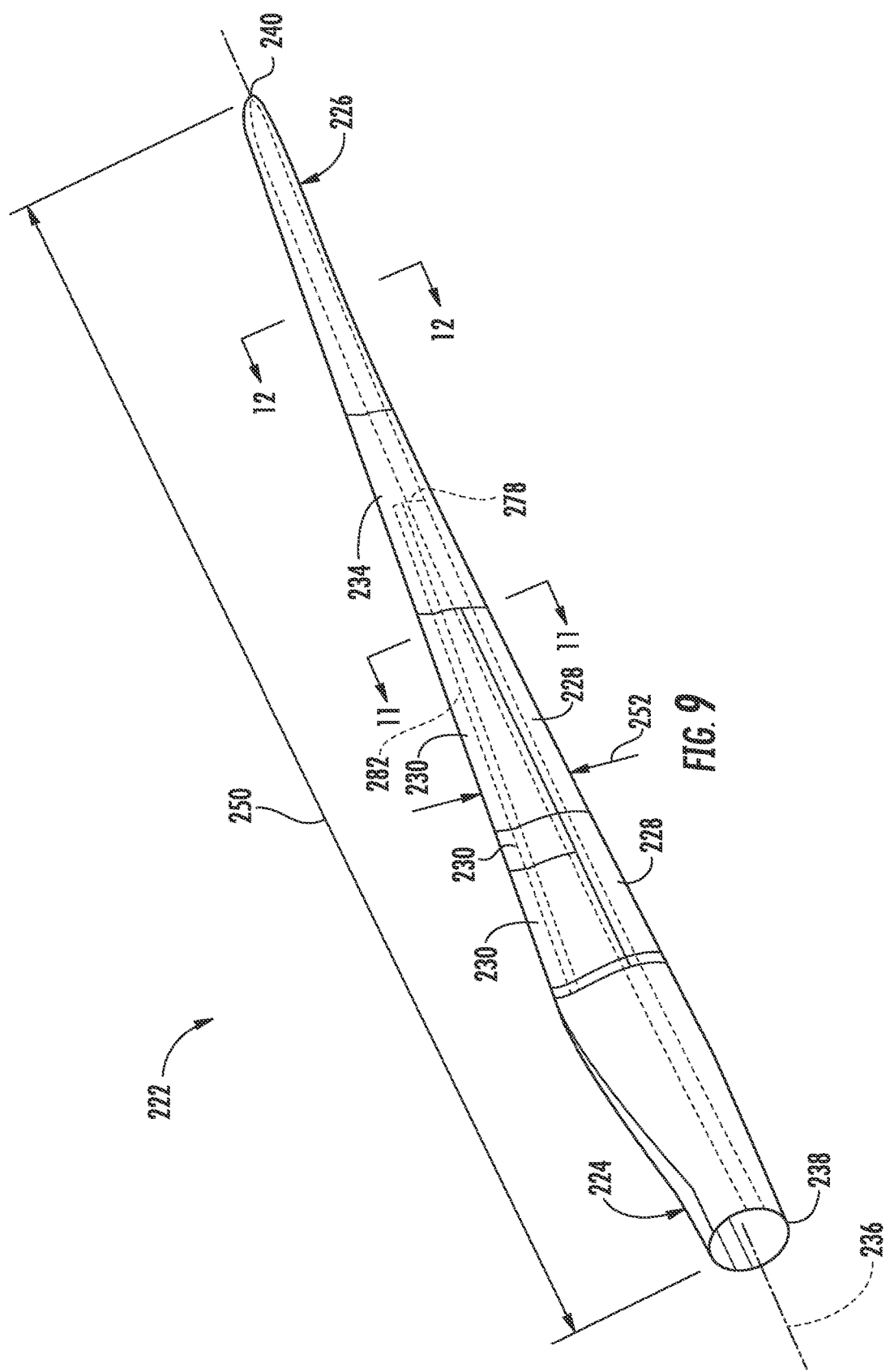
FIG. 9 illustrates a perspective, assembled view of one embodiment of a modular rotor blade configured in accordance with aspects of the present subject matter.
Figure 10:
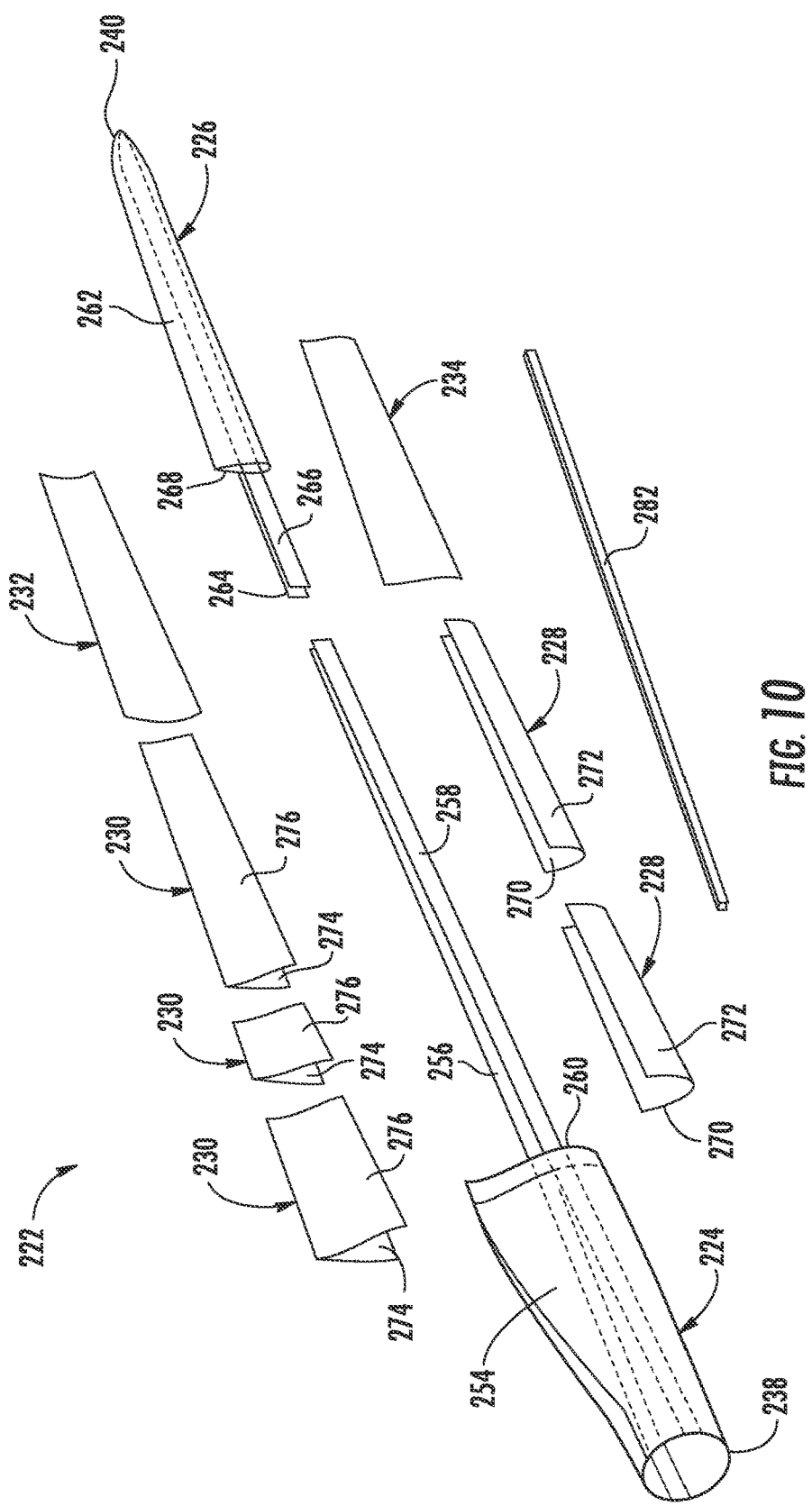
FIG. 10 illustrates a perspective, exploded view of the modular rotor blade shown in FIG. 9.
Figure 11:
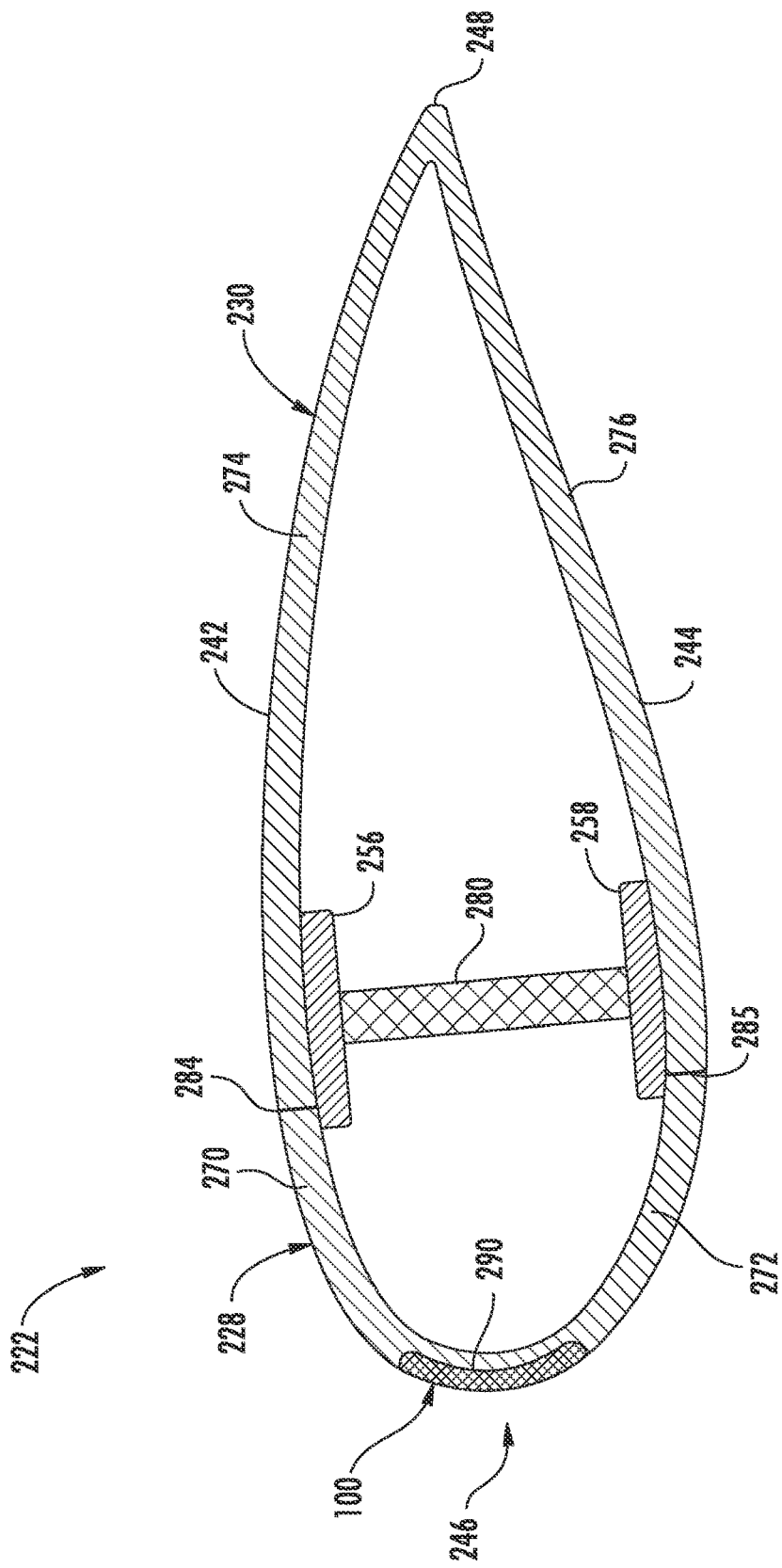
FIG. 11 illustrates a cross-sectional view of the modular rotor blade shown in FIG. 9 taken about line 11-11, particularly illustrating the disclosed leading edge cap being installed at the leading edge of the blade.
Figure 12:
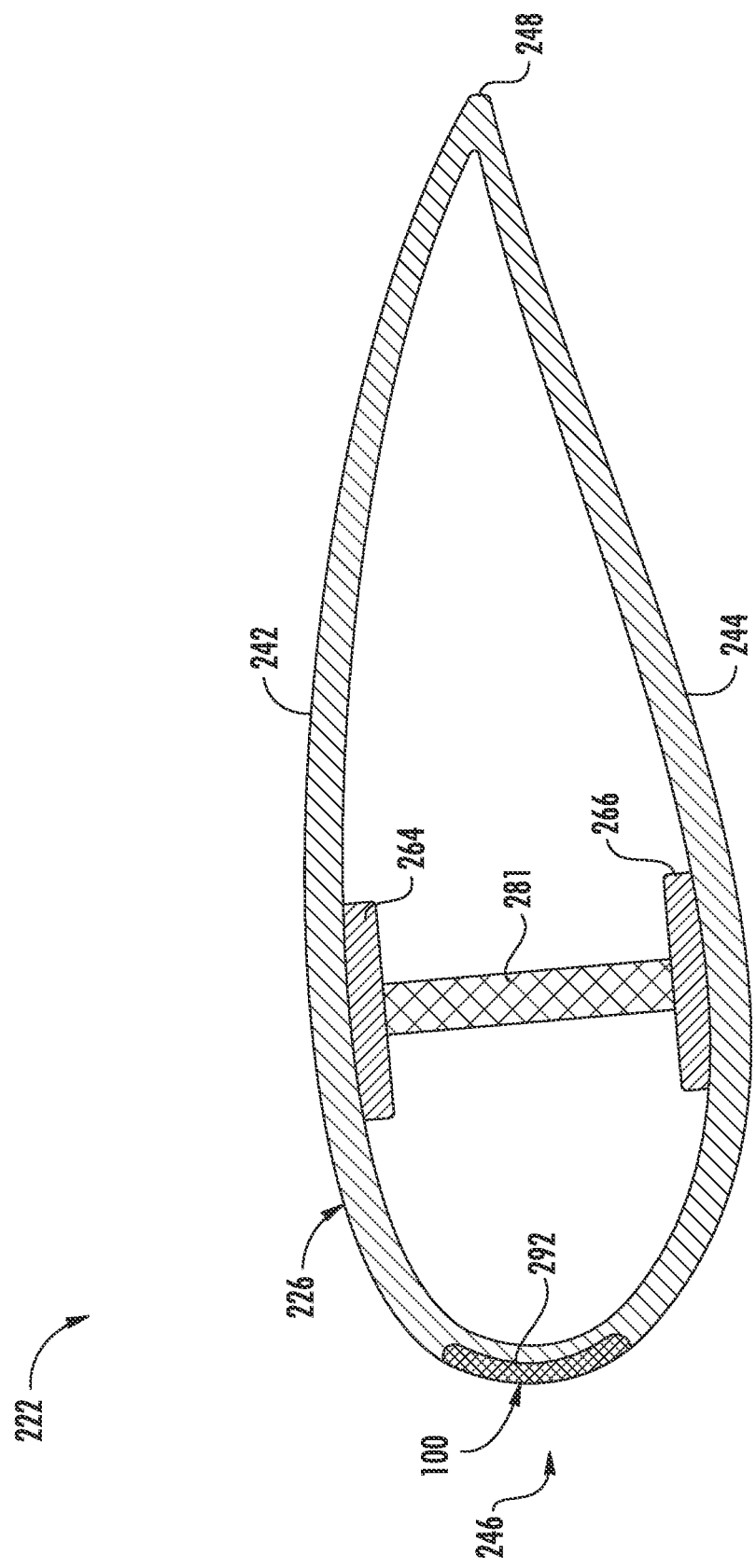
FIG. 12 illustrates a cross-sectional view of the modular rotor blade shown in FIG. 9 taken about line 12-12, particularly illustrating the disclosed leading edge cap being installed at the leading edge of the blade.

It should also be appreciated that, although the present subject matter has generally been described herein with reference to installing a leading edge cap at the leading edge of a rotor blade simply including pressure and suction side shells, the disclosed leading edge cap 100 may also be installed onto a rotor blade having any other suitable configuration, including a modular configuration. For example, FIGS. 9 and 10 illustrate views of a modular rotor blade 222 onto which the disclosed leading edge cap 100 may be installed in accordance with aspects of the present subject matter. Specifically, FIG. 9 illustrates an assembled, perspective view of the modular rotor blade 222 and FIG. 10 illustrates an exploded view of the rotor blade 222 shown in FIG. 9. Additionally, FIGS. 11 and 12 illustrate cross-sectional views of portions of the modular rotor blade 222 having the leading edge cap 100 installed thereon. For example, FIG. 11 illustrates a cross-sectional view of the modular rotor blade 222 shown in FIG. 9 taken about line 11-11, with the leading edge cap 100 being installed thereon at the leading edge of the blade 222. Similarly, FIG. 12 illustrates a cross-sectional view of the modular rotor blade 222 shown in FIG. 9 taken about line 12-12, with the leading edge cap 100 being installed thereon at the leading edge of the blade 222.

As shown, the rotor blade 222 has a modular configuration including a plurality of blade sections 224, 226, 228, 230, 232, 234 configured to be coupled together to form a complete rotor blade. For instance, in the illustrated embodiment, the rotor blade 222 includes a pre-formed blade root section 224, a pre-formed blade tip section 226 disposed opposite the blade root section 224 and a plurality of intermediate blade segments 228, 230, 232, 234 configured to be arranged between the blade root section 224 and the blade tip section 226 along a longitudinal axis 236 (FIG. 9) of the rotor blade 222. The blade root section 224 may generally be configured to define or form a blade root or root end 238 for coupling the rotor blade 222 to the hub 20 (FIG. 1) of the wind turbine 10. Similarly, the tip section 226 may generally define a blade tip or tip end 240 corresponding to the outermost portion of the rotor blade 222 along its longitudinal axis 236. It should be appreciated that the various blade sections 224, 226, 228, 230, 232, 234 may collectively define or form the body shell of the modular rotor blade 222.

When assembled, the rotor blade 222 may generally define a substantially aerodynamic profile, such as by defining a symmetrical or cambered airfoil-shaped cross-section. For instance, as shown in FIGS. 11 and 12, the rotor blade 222 may define a pressure side 242 and a suction side 244 extending between leading and trailing edges 246, 248. Additionally, as particularly shown in FIG. 9, the assembled rotor blade 222 may generally have a span 250 defining the total length between the root end 238 and the tip end 240 of the blade 222 and a chord 252 defining the total length between the leading edge 246 and the trailing edge 248 of the blade 222. As is generally understood, the chord 252 may generally vary in length with respect to the span 250 as the rotor blade 222 extends from its root end 238 to its tip end 420.

As shown in FIG. 10, the blade root section 224 may generally include a root portion 254 and one or more continuous, longitudinal spar caps 256, 258 co-infused with the root portion 254, with the spar cap(s) 256, 258 generally extending outwardly from the root portion 254 in the spanwise direction of the rotor blade 222. The root portion 254 may extend lengthwise between the root end 238 of the blade root section 224 and an outboard end 260. Similarly, as shown in FIG. 10, the blade tip section 226 may generally include a tip portion 262 and one or more continuous, longitudinal spar caps 264, 266 co-infused with the tip portion 262, with the spar cap(s) 264, 266 generally extending outwardly from the tip portion 262 in the spanwise direction of the rotor blade 222. The tip portion 262 may extend lengthwise between an inboard end 268 and the tip end 240 of the blade tip section 226.

As indicated above, the rotor blade 222 may also include a plurality of intermediate blade segments 228, 230, 232, 234, 236 configured to be positioned between the root and tip sections 224, 226. For example, as shown in FIG. 10, the rotor blade 222 may include a plurality of leading edge segments 228 and a plurality of trailing edge segments 230 configured to be assembled between the blade root section 224 and the blade tip section 226 along the longitudinal axis 236 of the rotor blade 222. In such an embodiment, each leading edge segment 228 may be configured to define a spanwise section of the leading edge 246 of the rotor blade 222 and may include first and second side sections 270, 272 extending from the leading edge 246 so as to form portions of the pressure and suction sides 242, 244 of the rotor blade 222, respectively. Similarly, each trailing edge segment 230 may be configured to define a spanwise section of the trailing edge 248 of the rotor blade 222 and may include first and second side sections 274, 276 extending from the trailing edge 248 so as to form portions of the pressure and suction sides 242, 244 of the rotor blade 222, respectively. As such, to assemble the rotor blade 222, the side sections 270, 272 of each leading edge segment 228 may be configured to be coupled to the side sections 274, 276 of a corresponding trailing edge segment 230 at an interface defined between such components to form a spanwise section of the rotor blade 222 that includes complete pressure and suction sides 242, 244 extending between the leading and trailing edges 246, 248 of the blade 222. For instance, as particularly shown in FIG. 11, the side sections 270, 272, 274, 276 of the leading and trailing edge segments 228, 230 may be coupled together at pressure and suction side seams or joints 284, 285 that overlap the structural components of the rotor blade 222 (e.g., the spar caps 256, 258).

Moreover, as shown in FIG. 10, in addition to the leading and trailing edge segments 228, 230, the rotor blade 222 may, in certain embodiments, also include at least one pressure side segment 232 and/or at least one suction side segment 234. In such embodiments, the pressure side segment(s) 232 may generally correspond to a spanwise section of the rotor blade 222 that extends between the leading and trailing edges 246, 248 so as to define the pressure side 242 of the blade 222. Similarly, the suction side segment(s) 234 may generally correspond to a spanwise section of the rotor blade 222 that extends between the leading and trailing edges 246, 248 so as to define the suction side 244 of the blade 222. As such, to assemble the rotor blade 222, each pressure side segment 232 may be coupled to a corresponding suction side segment 234 at the interface defined between such components at the leading and trailing edges 246, 248 of the rotor blade 222.

The rotor blade 222 may also include one or more structural components configured to provide increased stiffness, buckling resistance and/or strength to the rotor blade 222. For example, as indicated above, the blade root section 224 may include opposed longitudinally extending spar caps 256, 258 that are configured to extend outwardly from the root portion 254 of the blade root section 224 towards the blade tip section 226 along the spanwise direction of the rotor blade 222. Similarly, the blade tip section 226 may include two opposed, longitudinally extending spar caps 264, 266 configured to extend inwardly from the tip portion 262 of the blade tip section 226 towards the blade root section 224 along the spanwise direction of the rotor blade 222. In such embodiments, the blade root section 224 and the blade tip section 226 may be configured to be joined to one another via their respective spar caps 256, 258, 264, 266. For instance, in several embodiments, the outer ends of each blade root spar cap 256, 258 may be configured to be coupled to the inner ends of the corresponding blade tip spar cap 264, 266 at a spar cap joint 278 (FIG. 10) so as to couple the blade root section 224 to the blade tip section 226.

The rotor blade 222 may also include one or more shear webs 280, 281 configured to extend between the opposed blade root spar caps 256, 258 and/or between the opposed blade tip spar caps 264, 266. Specifically, as shown in FIG. 11, the rotor blade 222 may include a first shear web 280 configured to be coupled directly between the blade root spar caps 256, 258. Similarly, as shown in FIG. 12, the rotor blade 222 may include a second shear web 281 configured to be coupled directly between the blade tip spar caps 264, 266.

It should be appreciated that the rotor blade 222 may also include one or more additional structural components. For instance, as shown in FIGS. 9 and 10, the rotor blade 222 may include an auxiliary structural component 282 configured to be coupled to the root portion 254 of the blade root section 224 and extend outwardly therefrom in the spanwise direction of the rotor blade 222 at a location generally adjacent to the trailing edge 248 of the blade 222.

It should also be appreciated that, in alternative embodiments, the rotor blade 222 may have any other suitable modular configuration, including having any other suitable number and/or configuration of blade sections and/or blade segments. For instance, in one embodiment, the rotor blade 222 may only include leading and trailing edge segments 228, 230 positioned between the blade root and tip sections 224, 226. In another embodiment, the rotor blade 222 may only include pressure and suction side segments 232, 234 positioned between the blade root and tip sections 224, 226.

As indicated above, the disclosed leading edge cap 100 may be configured to be installed along the leading edge 246 of the rotor blade 222 at one or more locations. For example, as shown in FIG. 11, the leading edge cap 100 has been installed along the portion of the leading edge 246 defined by one or more of the leading edge segments 228. In such an embodiment, the leading edge segment(s) 228 may be configured to define a recessed area 290 to allow a smooth, aerodynamic surface to be defined between the leading edge cap 100 and the leading edge segment(s) 228 at the interface(s) between such components. Additionally, similar to the embodiments described above, the leading edge segment(s) 228 may include a thermoplastic resin material at the interface(s) between the segment(s) 228 and the leading edge cap 100. For example, the leading edge segment(s) 228 may be formed from a thermoplastic-based fiber-reinforced composite (e.g., a fiber-reinforced composite including a plurality of fibers surrounded by a thermoplastic resin material) or the leading edge segment(s) 228 may include a layer or coating of thermoplastic resin material disposed at the interface(s) defined between the segment(s) 228 and the leading edge cap 100 (e.g., similar to that shown in FIG. 8).

Similarly, as shown in FIG. 12, the leading edge cap 100 has been installed along the portion of the leading edge 246 defined by the blade tip segment 226. In such an embodiment, the blade tip segment 226 may be configured to define a recessed area 292 to allow a smooth, aerodynamic surface to be defined between the leading edge cap 100 and the blade tip segment 226 at the interface between such components. Additionally, similar to the embodiments described above, the blade tip segment 226 may include a thermoplastic resin material at the interface between the segment 226 and the leading edge cap 100. For example, the blade tip segment 226 may be formed from a thermoplastic-based fiber-reinforced composite (e.g., a fiber-reinforced composite including a plurality of fibers surrounded by a thermoplastic resin material) or the blade tip segment 226 may include a layer or coating of thermoplastic resin material disposed at the interface defined between the segment 226 and the leading edge cap 100 (e.g., similar to that shown in FIG. 8).

It should be appreciated that the leading edge cap 100 may also be configured to be installed at and/or extend lengthwise across one or more other sections of the rotor blade 222. For example, the leading edge cap 100 may be installed at and/or extend lengthwise across the portion(s) of the leading edge 246 of the rotor blade 222 defined at the interface between the pressure and suction side segments 232, 234. In such an embodiment, the cross-sectional view of the rotor blade 222 at such location may be similar to the cross-sectional views shown in FIGS. 3-5 and/or FIG. 8.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A rotor blade for a wind turbine, the rotor blade comprising:
a blade root;
a blade tip opposite the blade root;
a body shell extending between the blade root and the blade tip, the body shell including a pressure side and a suction side extending between a leading edge and a trailing edge, the body shell defining an outer shell surface; and a leading edge cap coupled to the body shell at the leading edge, the leading edge cap being formed from a fiber-reinforced composite including an inner surface extending directly adjacent to the body shell along a portion of the outer shell surface and an outer surface opposite the inner surface, the fiber-reinforced composite including a plurality of fibers surrounded by a thermoplastic resin material, wherein the thermoplastic resin material extends throughout the fiber reinforced composite from the inner surface to the outer surface, and wherein a portion of the outer shell surface of the body shell is recessed such that the body shell defines a recessed area extending across the leading edge between first and second ends, the leading edge cap being received within the recessed area.

2. The rotor blade of claim 1, wherein the body shell is formed from a pressure side shell and a suction side shell.

3. The rotor blade of claim 2, wherein a leading edge joint is defined between the pressure and suction side shells at the leading edge, the leading edge cap extending across the leading edge joint so as to be coupled to both an outer shell surface of the pressure side shell and an outer shell surface of the suction side shell.

4. The rotor blade of claim 3, wherein the pressure and suction side shells are both formed from fiber-reinforced composites including a plurality of fibers surrounded by a shell thermoplastic resin material, wherein the thermoplastic resin material of the leading edge cap is welded to the shell thermoplastic resin material of the pressure and suction side shells at an interface defined between the inner surface of the leading edge cap and the outer shell surfaces of the pressure and suction side shells.

5. The rotor blade of claim 4, wherein the shell thermoplastic resin material of the pressure side shell is welded to the shell thermoplastic resin material of the suction side shell at the leading edge joint.

6. The rotor blade of claim 1, wherein the rotor blade corresponds to a modular rotor blade and the body shell is at least partially formed from at least one of a blade root segment, a blade tip segment; a leading edge segment, a trailing edge segment; a pressure segment or a suction side segment.

7. The rotor blade of claim 6, wherein the leading edge cap is coupled to a portion of the body shell formed from at least one of the blade tip segment, the leading edge segment or the pressure and suction side segments.

8. The rotor blade of claim 1, wherein the body shell includes a thermoplastic layer positioned at the leading edge, wherein the thermoplastic resin material of the leading edge cap is welded to the thermoplastic layers of the body shell at an interface defined between the inner surface of the leading edge cap and the outer shell surface of the body shell.

9. The rotor blade of claim 1, wherein the fiber-reinforced composite of the leading edge cap further includes an erosion resistant additive dispersed within the thermoplastic resin material.

10. A rotor blade for a wind turbine, the rotor blade comprising:
a blade root;
a blade tip opposite the blade root;
a body shell extending between the blade root and the blade tip, the body shell including a pressure side and a suction side extending between a leading edge and a trailing edge, the body shell defining an outer shell surface and being formed from a fiber-reinforced composite including a plurality of fibers surrounded by a shell thermoplastic resin material; and a leading edge cap coupled to the body shell at the leading edge, the leading edge cap being formed from a fiber-reinforced composite including an inner surface extending directly adjacent to the body shell along a portion of the outer shell surface and an outer surface opposite the inner surface, the fiber-reinforced composite including a plurality of fibers surrounded by a thermoplastic resin material, wherein the thermoplastic resin material of the leading edge cap is welded to the shell thermoplastic resin material of the body shell at an interface defined between the inner surface of the leading edge cap and the outer shell surface of the body shell, and wherein a portion of the outer shell surface of the body shell is recessed such that the body shell defines a recessed area extending across the leading edge between first and second ends, the leading edge cap being received within the recessed area.

11. The rotor blade of claim 10, wherein the body shell includes a pressure side shell and a suction side shell formed from the fiber-reinforced composite.

12. The rotor blade of claim 11, wherein a leading edge joint is defined between the pressure and suction side shells at the leading edge, the leading edge cap extending across the leading edge joint so as to be coupled to both an outer shell surface of the pressure side shell and an outer shell surface of the suction side shell at the interface.

13. The rotor blade of claim 10, wherein the rotor blade corresponds to a modular rotor blade and the body shell is at least partially formed from at least one of a blade root segment, a blade tip segment, a leading edge segment, a trailing edge segment, a pressure segment or a suction side segment.

14. The rotor blade of claim 13, wherein the leading edge cap is coupled to a portion of the body shell formed from at least one of the blade tip segment, the leading edge segment or the pressure and suction side segments.

15. The rotor blade of claim 10, wherein the leading edge cap is received within the recessed area such that the exterior surface of the leading edge cap is substantially aligned with the outer shell surface of the body shell at the first and second ends of the recessed area.

16. The rotor blade of claim 10, wherein the fiber-reinforced composite of the leading edge cap further includes an erosion resistant additive dispersed within the thermoplastic resin material.

17. The rotor blade of claim 10, wherein the thermoplastic resin material extends throughout the fiber reinforced composite of the leading edge cap from the inner surface to the outer surface.

18. A method for assembling a rotor blade of a wind turbine, the rotor blade including a body shell having a pressure side and a suction side extending between a leading edge and a trailing edge, the method comprising:
positioning a leading edge cap adjacent to an outer shell surface of the body shell at the leading edge of the rotor blade, the body shell being formed at least partially from a shell thermoplastic resin material, the leading edge cap being formed from a fiber-reinforced composite including an inner surface extending directly adjacent to the outer shell surface and an outer surface opposite the inner surface, the fiber-reinforced composite including a plurality of fibers surrounded by a thermoplastic resin material; and welding the thermoplastic resin material of the leading edge cap to the shell thermoplastic resin material of the body shell at an interface defined between the inner surface of the leading edge cap and the outer shell surface of the body shell, wherein a portion of the outer shell surface of the body shell is recessed such that the body shell defines a recessed area extending across the leading edge between first and second ends, the leading edge cap being received within the recessed area.

\* \* \* \* \*